No. 610,774. Patented Sept. 13, 1898.
J. SMITH & W. HOLDSWORTH.
GILL BOX FOR PREPARING WOOL.
(Application filed Jan. 29, 1898.)
(No Model.) 2 Sheets—Sheet 1.
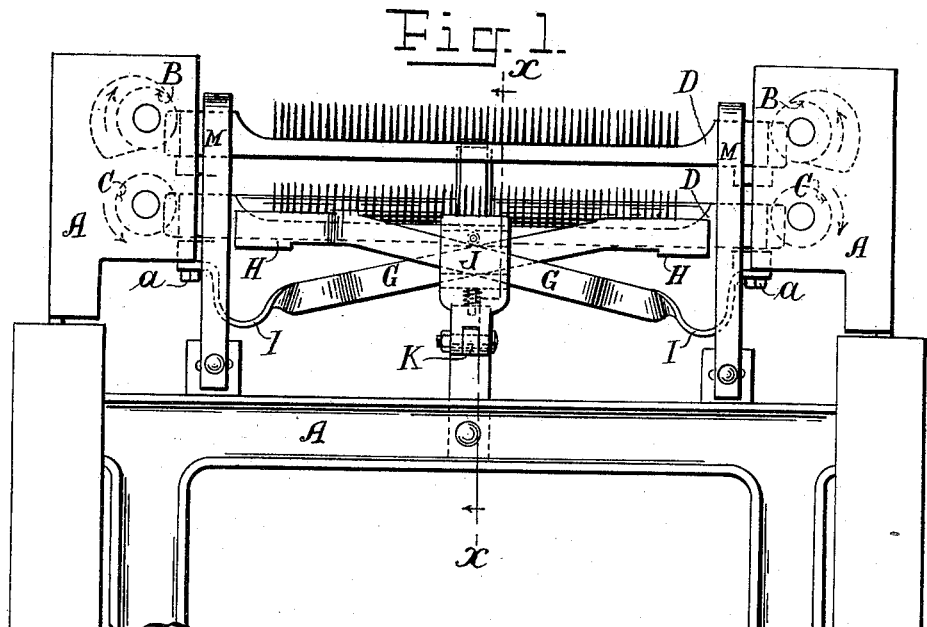
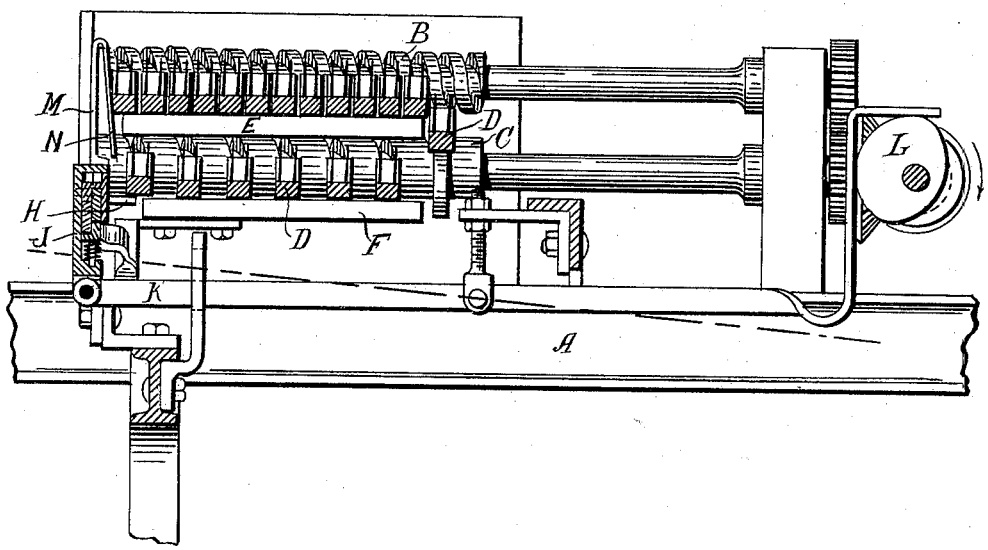
Witnesses:
George H. Bliss Jr.
Charles Biault
Inventors:
Joseph Smith, and
William Holdsworth
by Herbert W. Jenner.
Attorney.

No. 610,774. Patented Sept. 13, 1898.
J. SMITH & W. HOLDSWORTH.
GILL BOX FOR PREPARING WOOL.
(Application filed Jan. 29, 1898.)
(No Model.) 2 Sheets—Sheet 2.
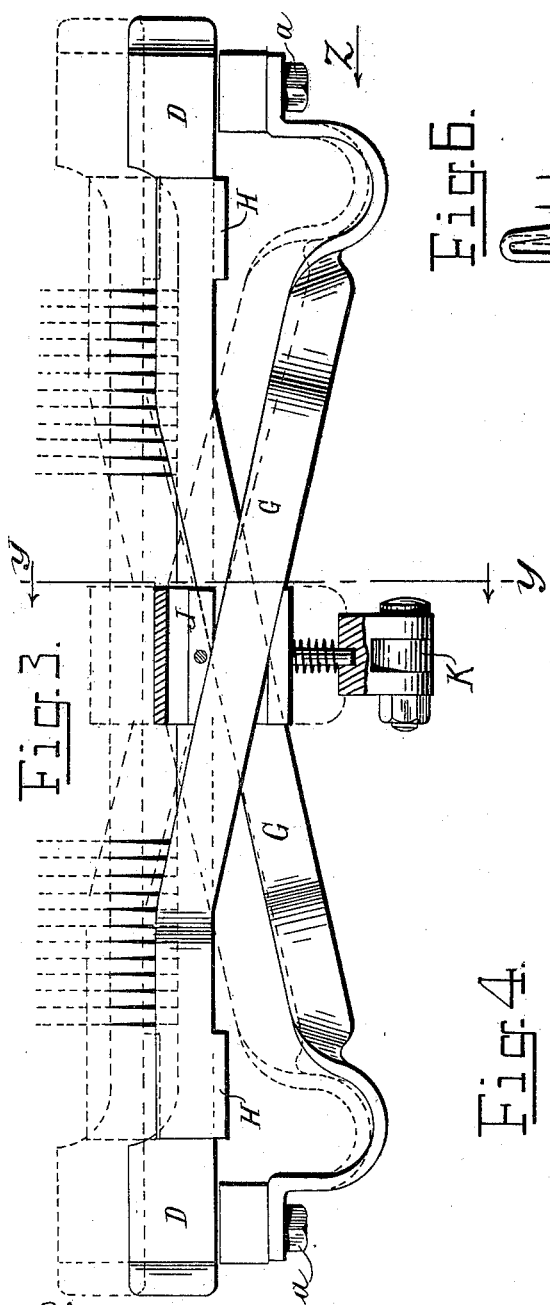
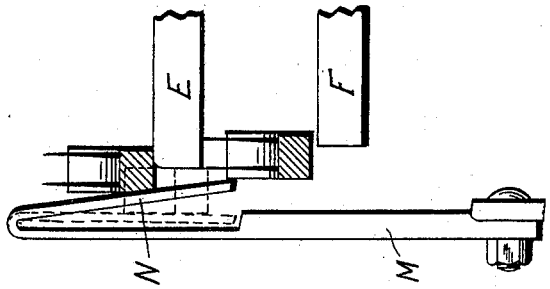
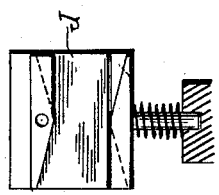
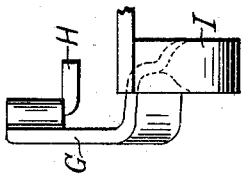
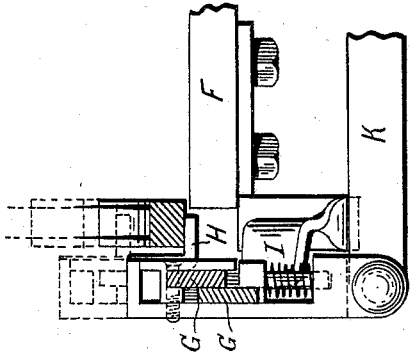
Witnesses:
George H. Bliss Jr.
Charles Beavett.
Inventors.
Joseph Smith and
William Holdsworth
by Herbert W. Jenner.
Attorney.

UNITED STATES PATENT OFFICE.

JOSEPH SMITH AND WILLIAM HOLDSWORTH, OF HALIFAX, ENGLAND.

GILL-BOX FOR PREPARING WOOL.

SPECIFICATION forming part of Letters Patent No. 610,774, dated September 13, 1898.

Application filed January 29, 1898. Serial No. 668,473. (No model.)

*To all whom it may concern:*

Be it known that we, JOSEPH SMITH and WILLIAM HOLDSWORTH, subjects of the Queen of Great Britain, residing at Halifax, in the county of York, England, have invented certain new and useful Improvements in Gill-Boxes for Preparing Wool and other Fibers; and we do hereby declare the following to be a full, clear, and exact description of the invention, such as will enable others skilled in the art to which it appertains to make and use the same.

This invention relates to gill-boxes employed in preparing wool and other fibers.

This invention consists in the novel construction and combination of the parts hereinafter fully described and claimed.

In the drawings, Figure 1 is an end view of the machine. Fig. 2 is a longitudinal section taken on the line $x$ $x$ in Fig. 1. Fig. 3 is a detail view of the lowering-bars, drawn to a larger scale. Fig. 4 is a cross-section taken on the line $y$ $y$ in Fig. 3. Fig. 5 is an end view of one of the lowering-bars. Fig. 6 is a detail side view of one of the springs N and the parts coacting with it. Fig. 7 is a detail view of the box J.

A is the framework of the machine; B, the upper screw for working the fallers forward; C, the lower screw employed to bring the fallers D backward. E is the upper saddle or bed, upon which the upper fallers travel, and F is the lower saddle or bed, upon which the lower fallers travel. All of the above parts are of ordinary construction and form no part of our invention.

In order to prevent the fallers dropping from the upper saddle to the lower saddle, as is customary, we, according to our invention, employ a support, preferably consisting of a pair of diagonal spring-bars G, each outer end of which is provided with a foot or projection H. The opposite ends of these diagonal bars are made with springs I, secured under the framework A by nuts $a$.

Fig. 5 is an end view of one of the diagonal levers G. These diagonal spring-bars are supported or connected about the middle thereof in a box or casing J, (see Fig. 7,) the bottom of which is attached to a pivoted lever K, controlled by cam or tappet L at the back of the machine. This cam is so timed that as each upper faller D arrives at the outward end of the upper saddle E the diagonal arms G, Fig. 1, with the projections H, are just in a position to receive the faller as it leaves the saddle and lower it onto the lower saddle F. (See Fig. 4.) The weight of the faller also partly overcomes the elasticity of the springs I, whereby each faller is lowered or carried from the top saddle to the lower saddle and not allowed to drop, as is customary, whereby the wear and tear of the extreme ends of the fallers, together with the saddles upon which they are dropped, is now entirely avoided, and the noise occasioned by their dropping from the top saddle to the bottom saddle is considerably lessened.

The object of the second part of our invention is to provide means to guide the fallers in their descent from the upper saddle E to the lower saddle F and to prevent the said fallers from rebounding and becoming locked and also to force each faller as it drops upon the lower saddle into a positive position to be taken hold of by the lower screws C, Fig. 2, and this we propose to do by dispensing with the guide-spring at present in use and using instead thereof a new form of vertical bar M, the upper end of which is made with an inverted spring-leg N. Each end of the faller has a groove formed in it opposite to the spring-leg, as is usual, and as each faller D arrives at the end of the top saddle E it compresses the spring-leg N, and it is guided accurately down to the bottom saddle; but as soon as the said faller has got to the under side of the upper saddle E the spring-leg is released and it immediately springs forward, forcing the faller onto the lower bed into a position which prevents its rebounding, nor can it become locked, but is at once received into the bottom screws.

By means of our invention the wear and tear of the fallers and bed and screws is considerably lessened, in addition to which there is less liability of the fallers getting locked, which is a frequent occurrence in the present machines, while these several advantages permit the machine to be run at an increased speed. Thus the said machine will do more work than those at present in use. As the spring-feet carry the faller gently down onto their bed, the loud noise occasioned by their dropping from the top screw to the bottom screw is considerably lessened.

We claim as our invention—

1. The combination, with the fallers, and the upper and lower saddles; of a pivoted lever, means for oscillating the said lever periodically, and a support for receiving the fallers as they slide off the upper saddle, said support being operatively connected with and lowered by the said lever, substantially as set forth.

2. The combination, with the fallers, and the upper and lower saddles; of a spring-support for receiving the fallers as they slide off the upper saddle, and means for lowering the said support periodically, substantially as set forth.

3. The combination, with the fallers, and the upper and lower saddles; of a pair of crossed and pivoted bars which receive the fallers as they slide off the upper saddle, and means for lowering and raising the said bars periodically, substantially as set forth.

4. The combination, with the fallers, and the upper and lower saddles; of a pair of crossed spring-bars which receive the fallers as they slide off the upper saddle, supports to which the said bars are secured, and means for lowering the said spring-bars periodically, substantially as set forth.

5. The combination, with the fallers, and the upper and lower saddles; of a pair of crossed and pivoted bars which receive the fallers as they slide off the upper saddle, a block engaging with the middle parts of the said bars, and means for lowering and raising the said block periodically, substantially as set forth.

In testimony whereof we affix our signatures in presence of two witnesses.

JOSEPH SMITH.
WILLIAM HOLDSWORTH.

Witnesses:
ARTHUR B. CROSSLEY,
FRANK LEWIS.